United States Patent [19]
Lichtner et al.

[11] 4,433,653
[45] * Feb. 28, 1984

[54] LIGHT METAL CYLINDER HEAD FOR A VALVE-CONTROLLED INTERNAL COMBUSTION ENGINE

[75] Inventors: Emil Lichtner, Odenthal-Voiswinkel; Gerd Ungeringer, Bergisch Gladbach; Gerhard Giebel, Cologne, all of Fed. Rep. of Germany

[73] Assignee: Klöckner-Humboldt-Deutz Aktiengesellschaft, Cologne, Fed. Rep. of Germany

[*] Notice: The portion of the term of this patent subsequent to Jul. 6, 1999 has been disclaimed.

[21] Appl. No.: 391,510

[22] Filed: Jun. 24, 1982

Related U.S. Application Data

[63] Continuation of Ser. No. 119,108, Feb. 6, 1980, Pat. No. 4,337,735.

[30] Foreign Application Priority Data

Feb. 9, 1979 [DE] Fed. Rep. of Germany ....... 2904940

[51] Int. Cl.³ .............................................. F02F 1/26
[52] U.S. Cl. ................................................ 123/193 H
[58] Field of Search ........ 123/193 R, 193 H, 193 CH, 123/668, 669, 657

[56] References Cited

U.S. PATENT DOCUMENTS

| | | | |
|---|---|---|---|
| 3,066,663 | 12/1962 | Rudy | 123/668 |
| 3,552,370 | 1/1971 | Briggs | 123/668 |

FOREIGN PATENT DOCUMENTS

| | | | |
|---|---|---|---|
| 1294093 | 4/1969 | Fed. Rep. of Germany | 123/193 H |
| 2937216 | 4/1981 | Fed. Rep. of Germany | 123/193 CH |
| 2061383 | 5/1981 | United Kingdom | 123/668 |

*Primary Examiner*—Craig R. Feinberg
*Attorney, Agent, or Firm*—Becker & Becker, Inc.

[57] ABSTRACT

A light metal cylinder head, for a valve controlled internal combustion engine, which has at least one metal insert in that bottom region located between the valves, and has a bore in the combustion chamber bottom region for an injection nozzle or a shot or filling passage and/or an ignition aid. A crack or fissure hindering or precluding oxide layer is coated, covered, or applied at least to the bottom region located between the valves, including the bore region, and the metal insert is made of a material resistant with respect to the method of producing the oxide layer. The oxide layer comprises aluminum oxide and is applied by anodic oxidation. The metal insert may comprise titanium. The oxide layer may have a thickness of at least 50 μm.

3 Claims, 2 Drawing Figures

LIGHT METAL CYLINDER HEAD FOR A VALVE-CONTROLLED INTERNAL COMBUSTION ENGINE

This is a continuation application of Ser. No. 119,108 filed Feb. 6, 1980 which has been allowed and is U.S. Pat. No. 4,337,735 dated July 6, 1982.

The present invention relates to a light metal cylinder head, for a valve-controlled internal combustion engine, which has at least one metal insert in that bottom region between the valves, and has a bore in the combustion chamber region for an injection nozzle or a shot or filling passage and/or an ignition aid.

Such a cylinder head is disclosed in German Patent 1294093. The metal web inserts thereof have the object to hinder or preclude heat cracks or fissures in the bottom region between the valves.

However, if cylinder heads are equipped with a central injection nozzle or a shot or filling passage and/or an ignition aid, then the heretofore known web inserts cannot preclude that heat cracks or fissures arise in the region of the nozzle bore, shot or filling passage bore, and/or ignition aid bore, with such cracks or fissures also extending as far as to the valve seats or as far as to the outer sealing surfaces of the cylinder bottom.

It is therefore an object of the present invention to equip cylinder heads of the aforementioned general type in such a way that with such cylinder heads no heat cracks or fissures arise or occur in the combustion chamber region of the cylinder head bottom.

This object, and other objects and advantages of the present invention, will appear more clearly from the following specification in connection with the accompanying drawing, in which.

Figure 1:
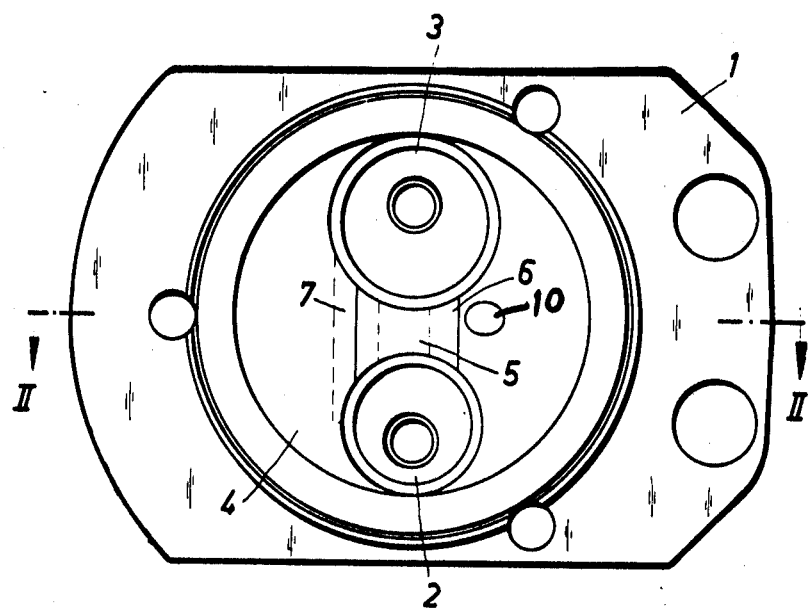
FIG. 1 shows the cylinder head of a valve-controlled internal combustion engine in a plan view of the cylinder head bottom.

The cylinder head of the present invention is characterized primarily in that at least the bottom region located between the valves, including the bore region, is covered or coated with a crack or fissure-hindering or precluding oxide layer, and that the metal insert is made of a material which is resistant and stable relative to the method or procedure for producing the oxide layer.

A reduction of temperature peaks is attained with the oxide layer on the one hand so that an equalization of the cylinder head bottom temperature is attained. On the other hand, the oxide layer has a different heat expansion compared with the light metal. Consequently, at operating temperature, great tensile stresses result in the oxide layer, so that the adjoining light metal region likewise is still subject to tensile stress. Thus precluded thereby is the otherwise occurring compressive stresses, which lead to heat cracks or fissures. The oxide layer additionally hinders or precludes the formation of shrink holes, voids, faults or contraction cavities which have been observed after a longer installation time in the region of the combustion chamber in the cylinder bottom.

An oxide layer suitable for this situation consists of aluminum oxide and is applied by anodic oxidation. This method, which in itself is known and is partially also utilized for the sealing surfaces between the cylinder head and the cylinder pipe or tube, previously could not be applied or utilized upon the cylinder head bottom with web inserts since the previously utilized web inserts of iron were attacked and destroyed by the method of producing the oxide layer. A known covering or protection alone of the web inserts against the anodic oxidation does not bring about the desired result, since a minimum adhesive spacing of 2 mm must be maintained, whereby this spacing between the bore or bores and the adjoining web inserts cannot be maintained for constructive reasons. Under these circumstances, however, on the one hand either the bore for the injection nozzle, the shot or filling passage, and/or the ignition aid could only be covered insufficiently with the oxide layer, or could not be arranged centrally. On the other hand, the covering is not suitable for an industrial mass production, since because of the tolerances during casting this covering always had to be applied manually, which would be very time-consuming and costly. By means of the present inventive teaching, however, it is now possible to effectively protect particularly these endangered cylinder head regions against heat cracks or fissures.

Since the oxide layer coating is not necessary over the entire cylinder head bottom in the combustion chamber region in accordance with the present invention, the remaining surfaces can be covered with a mask, mat or screen. This can be automatically carried out, since it is only necessary to assure that only the bottom surfaces must be covered with certainty with the oxide layer in the region of the valve web and, depending upon existence thereof, the injection nozzle bores and/or ignition aid bore and/or the shot or filling passage bore. The transition between the treated and untreated surfacing is tapered.

Tests have proven that as a material resistant relative to the oxide layer particularly titanium comes into consideration.

As further tests have shown, a sufficient effectiveness of the oxide layer is assured if the oxide layer is at least 50 $\mu$m thick.

Figure 2:
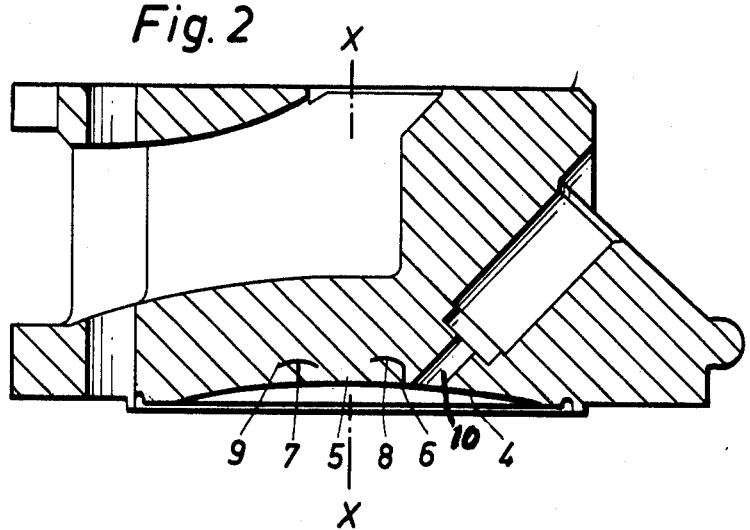
FIG. 2 shows the cylinder head of a valve-controlled internal combustion engine in a cross section taken along line II—II in FIG. 1.

Referring now to the drawing in detail, the illustrated cylinder head 1 has an outlet valve opening 2, an inlet valve opening 3, and a somewhat curved or arched cylinder head bottom 4. The bottom region 5 is located between the two valve openings 2 and 3 and, due to being thermally highly loaded, is particularly strongly inclined toward or susceptible to crack or fissure formation. This bottom region 5, which also surrounds the edge region of the bore 10 for the injection nozzle and/or the ignition aid, is separated by expansion joints or grooves 6 and 7 from the outer bottom region. These expansion grooves or joints 6 and 7 extend in a slightly curved or arcuate manner with respect to a line extending from valve opening to valve opening and connecting the middle points of both valve openings 2 and 3. The expansion joints 6 and 7 are filled in with plates or inserts 8,9 and can especially have the cross sectional shape illustrated in FIG. 2.

With this embodiment, the heat cracks or fissures are hindered or precluded in the bottom region between the valves, not however in every case those in the region of the nozzle bore and/or ignition aid bore 10 as well as those which originated with the existence of a shot or filling passage and which proceed as far as into the outer sealing region of the cylinder head with the cylinder pipe, tube or block.

For this reason, the cylinder head, after production or manufacture thereof along with the web inserts, is dipped into an acid bath. There the cylinder head is connected as an anode, and upon application of direct or alternating current having a high current density, a reinforced aluminum oxide layer which rigidly adheres to and become integral therewith is formed. The time that cylinder head 1 remains in the bath depends upon the size of the surface to be covered or coated and the thickness of the oxide layer. The layer thickness is sufficient when it has adhered and grown to a thickness of at least 50 μm. Depending upon the size of the cylinder head bottom, it may in this connection be expedient to cover or shield with a mask or screen that bottom region which is not included or counted with the regions endangered by cracks or fissures.

The present invention is, of course, in no way restricted to the specific disclosure of the specification and drawing, but also encompasses any modifications within the scope of the appended claims.

What we claim is:

1. A light metal cylinder head for an internal combustion engine controlled by valves, said cylinder head having a bottom which is adapted to be directed toward a combustion chamber belonging therewith, said bottom being provided with valve openings to allow communication with valves belonging therewith, and said cylinder head also having a bore communicating with said bottom substantially between said valve openings for receiving at least one of an injection nozzle and ignition aid, said cylinder head further having improvement in combination therewith comprising:

means defining at least one expansion gap generally and including therewith in particular at least one corrosion-resisant titanium metal insert in that porition of said bottom extending specifically between said valve openings and to a limited extent capable of taking up changing stresses in said cylinder head; and an oxide layer coating additionally provided by anodic oxidation only on that portion of said bottom located between said valve openings and the region of said bore, said oxide layer coating having complementary dual effect thereof both for preventing cracks as well as fissure tendency due to thermal stresses and simultaneously for equalizing localized temperature differences in the cylinder head entirely to protect against formation of cracks since further increase of the combustion chamber temperature is substantially reduced and taking-up of material stresses is made possible through more nominal heat expansion of said oxide layer coating compared with that of the light metal cylinder head itself, said metal insert comprising a material which is also resistant with respect to how said oxide layer coating is produced, said oxide layer coating providing insulation exclusively for a hot location in said bottom to decrease peak temperatures at said location on the one hand and on the other hand permitting only minimal increase of temperature thereof.

2. A light metal cylinder head in combination according to claim 1, in which said oxide layer coating has a minimum adhesive spacing of at least 2 mm that must be maintained therewith.

3. A light metal cylinder head in combination according to claim 1, in which said oxide layer coating is at least 50 μm thick and a transition between coating-treated and untreated surfacing is tapered.

* * * * *